April 5, 1949.　　　　　R. P. DELANO, JR　　　　　2,466,391
　　　　　STEAM LOCOMOTIVE POWER ADJUSTING MECHANISM
Filed Oct. 30, 1943　　　　FOR CAM ACTUATED VALVE
　　　　　　　　　　　　　　　　　　6 Sheets-Sheet 1

INVENTOR
Raymond P. Delano, Jr.
BY
ATTORNEYS

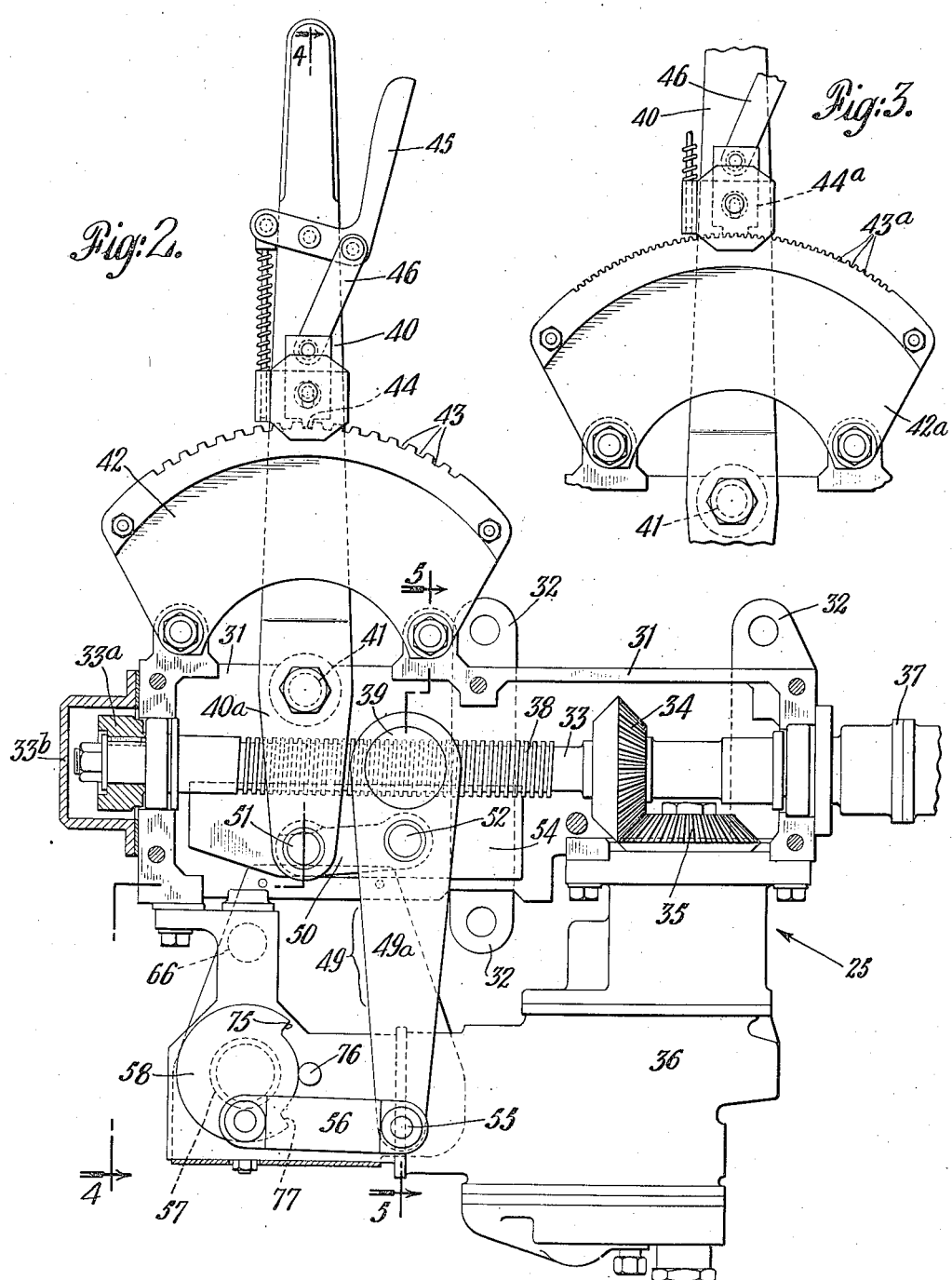

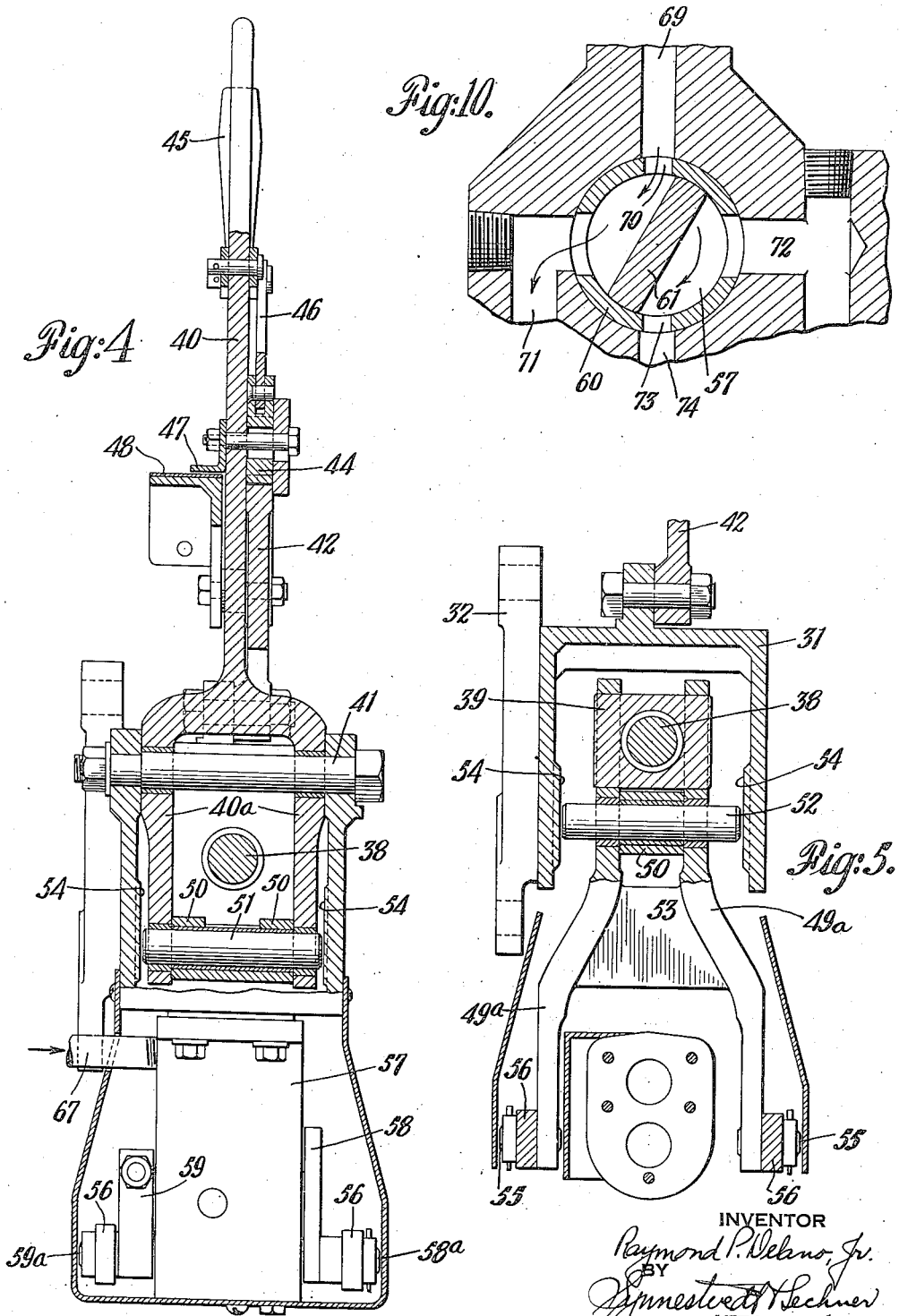

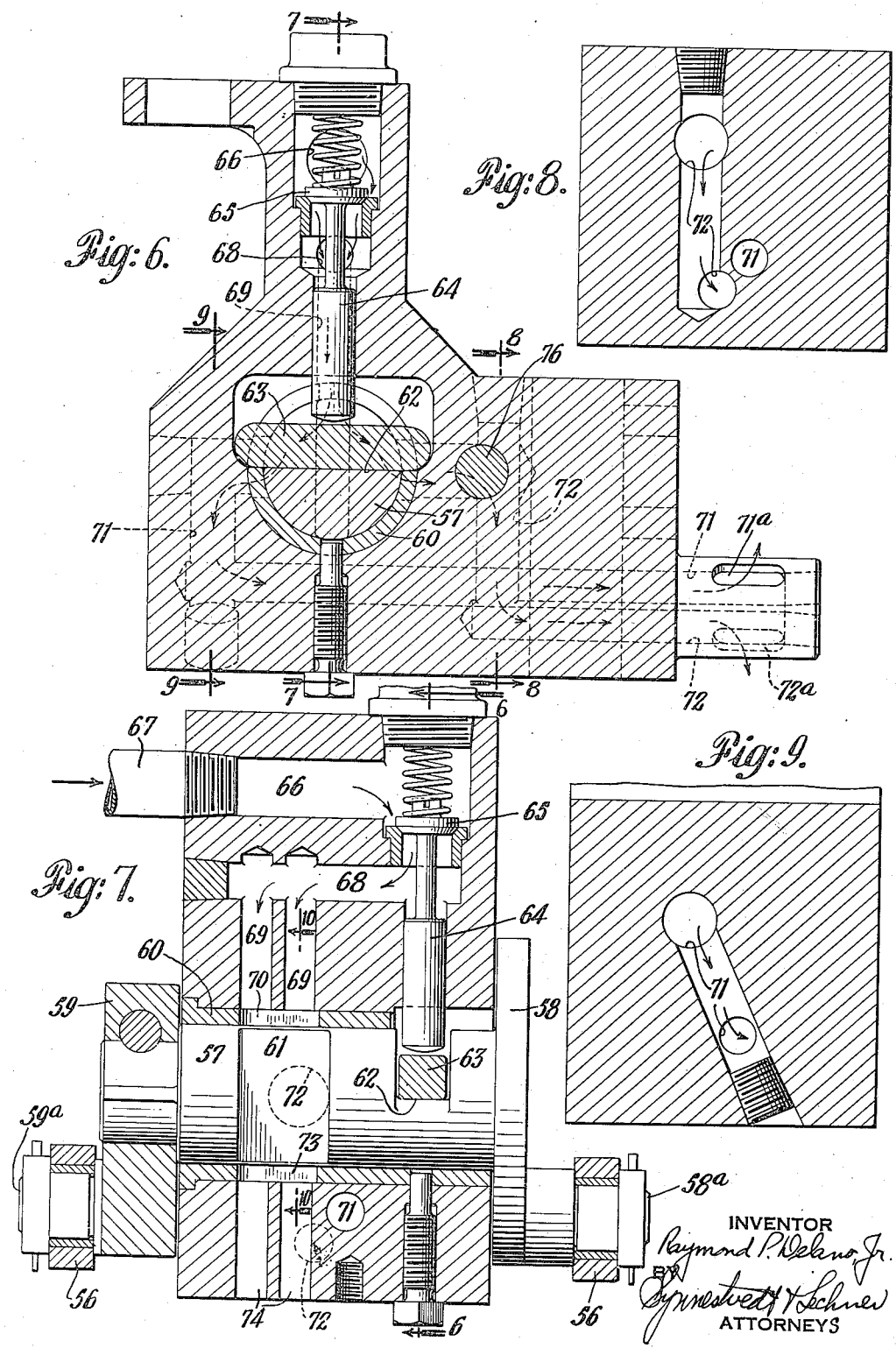

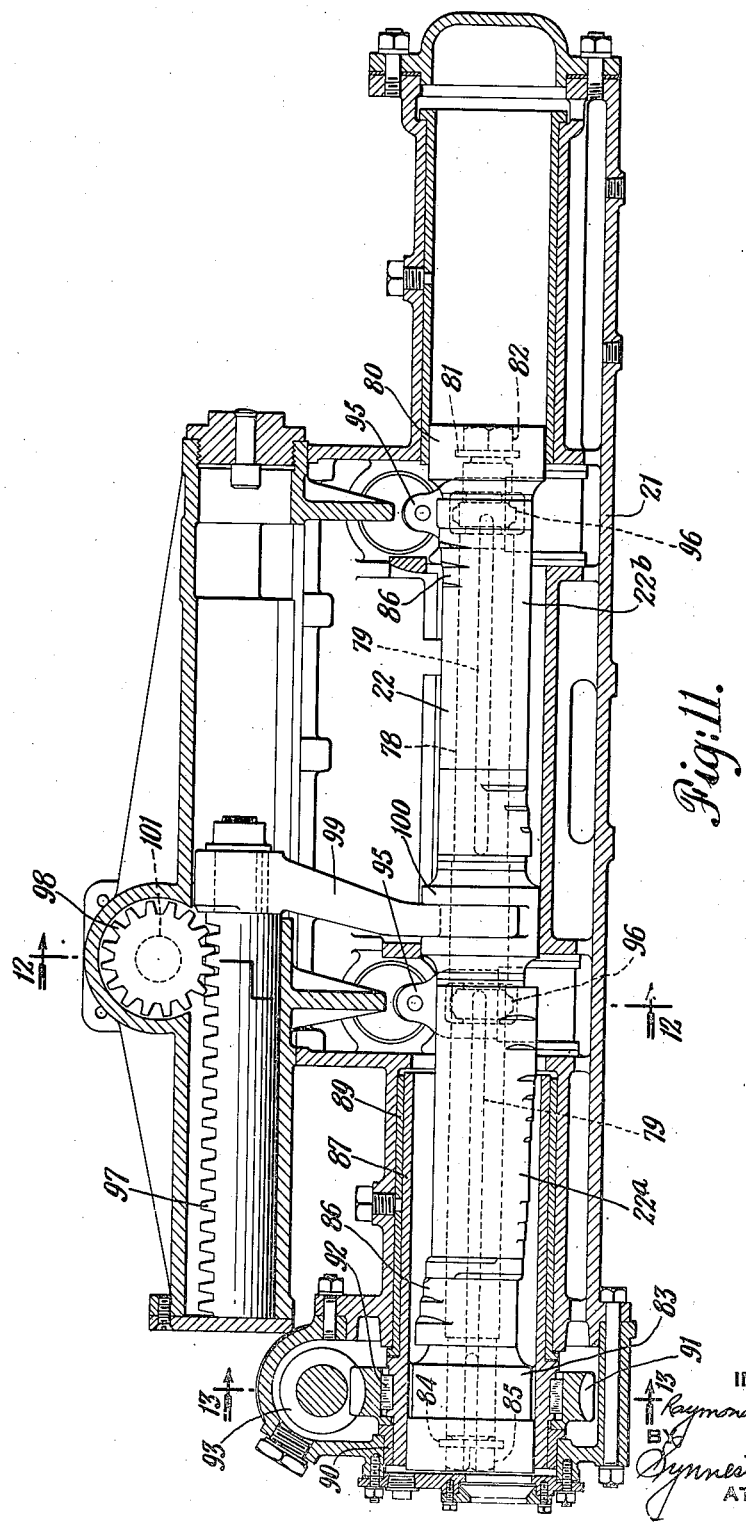

Patented Apr. 5, 1949

2,466,391

UNITED STATES PATENT OFFICE 2,466,391

STEAM LOCOMOTIVE POWER ADJUSTING MECHANISM FOR CAM ACTUATED VALVE

Raymond P. Delano, Jr., Baltimore, Md., assignor, by mesne assignments, to Franklin Railway Supply Company, New York, N. Y., a corporation of Delaware Application October 30, 1943, Serial No. 508,338

13 Claims. (Cl. 121—167)

This invention relates to steam locomotives and is broadly concerned with the mechanism for adjusting the valves and reversing the direction of operation. As is well known in this art, power reverse gears are employed for setting the valve motion mechanism for either forward or reverse operation and for adjustment to different positions within either the forward or the reverse range so as to alter the timing of the valves and my invention is particularly directed to the provision of an improved reverse gear. It is also concerned with a novel combination of power reverse gear and valve gear of the poppet type.

My improvements are especially useful in situations where the power reverse gear is of the motor operated screw type and, therefore, will be illustrated as applied to that type. As examples of such reverse gears reference may be had to Major T. Forker's U. S. Patent No. 2,327,344, issued August 24, 1943, as well as to the same inventor's copending application Serial No. 488,008, which has issued as Patent 2,428,069 dated September 30, 1947.

The principal objects of the invention are the provision of a mechanism of this general character which is more simple and rugged and by means of which it is possible to obtain more accurate as well as finer adjustments of the locomotive valves and one which will eliminate creeping of the valve gear in either direction and this latter without the employment of a special lock. It is also the purpose of the invention to provide a motor operated screw type power reverse gear which is controlled by a hand lever of the general character familiar to those skilled in this art, in connection with which object I also provide a mechanism by means of which the angular position of the screw will correspond with great accuracy to any given position of the hand lever whereby to permit unusually close control of the cut-off and to definitely fix the valve events for a given preselected setting of the gear. A further object of the invention involves the provision of a fluid pressure actuated motor for operating the reverse gear in which the motor is not under air pressure except at times when the cut-off is being changed. I also provide a construction in which a floating lever is used with the motor driven screw which floating lever has a lever ratio such as to yield a very much greater degree of valve motion as well as a more rapid valve action as compared or contrasted with the usual lever type piston operated gears heretofore known to the art. Still other objects of the invention are to provide a power reverse gear by means of which the cut-off position of the valves of the engine can be felt as well as seen and one in which no auxiliary or supplemental indicator driving mechanism is required; the provision of a mechanism whereby the possibility of overrunning a desired valve setting is greatly reduced; the provision of a device which requires no special locking mechanism and one in which no special travel limit device is needed; the provision of a novel combination of power reverse gear and valve gear the operation of which is substantially unaffected by expansion or contraction of the parts due to changes in temperature; and the provision of a combination power reverse gear and poppet type valve whereby the position of the valve gear will exactly correspond to any selected position of the power reverse gear.

How the foregoing objects, together with such other objects as may appear hereinafter or are incident to my invention are obtained is illustrated in a preferred embodiment in the accompanying drawings wherein:

Fig. 2 is a side elevation of my improved power reverse gear with certain parts in section to better illustrate some of the details;

Fig. 3 is a fragmentary view illustrating a modified type of quadrant for use where extremely fine adjustments are desired.

Fig. 4 is a section on a somewhat enlarged scale, taken as indicated by the line 4—4 on Fig. 2.

Fig. 5 is a section, also on an enlarged scale, taken as indicated by the line 5—5 on Fig. 2;

Fig. 6 is a vertical section through certain details of the control mechanism taken as indicated by the line 6—6 on Fig. 7;

Fig. 7 is a section on the line 7—7 of Fig. 6;

Fig. 8 is a section on the line 8—8 of Fig. 6;

Fig. 9 is a section on the line 9—9 of Fig. 6;

Fig. 10 is a section on the line 10—10 of Fig. 7;

Fig. 11 is a vertical longitudinal section through a cam box fitted with a stepped rotary cam.

Figure 1:
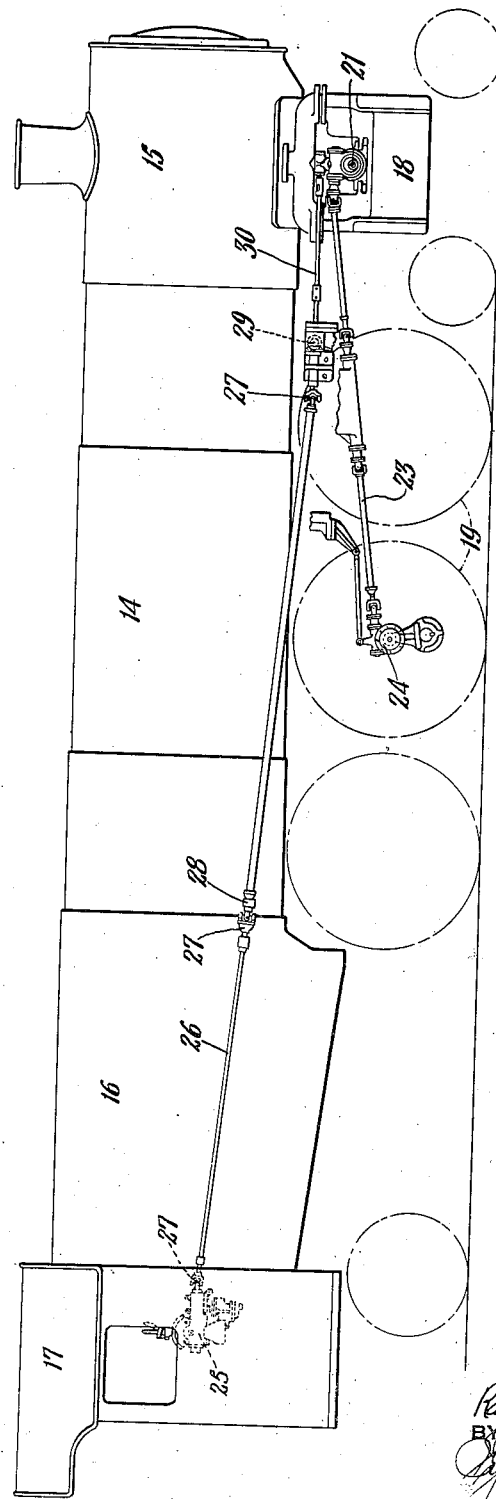
Fig. 1 is a diagrammatic side elevation of a locomotive equipped with my improvements.

In Figure 1 of the drawings I have illustrated a locomotive having a boiler 14, smokebox 15, firebox 16, cab 17, cylinders 18, and driving wheels 19. The valves for controlling the supply and exhaust of steam to the cylinders 18 are not illustrated because in and of themselves they form no part of the present invention. However, they are of the poppet valve type and are actuated by push rods such as shown at 20 in Figure 12. At each side of the locomotive in a housing 21, is located a rotary cam 22 (Figure 11) for actuating the valves associated with each cylinder 18, the details of which will be described more fully hereinafter. Each cam is driven through the medium of shafting 23 which, through suitable connections indicated as a whole at 24, derives its motion from one of the driving wheels 19.

The position of the cam and, therefore, the direction of motion of the locomotive, and the movements of the valves, are adjusted by means of the power reverse gear mechanism indicated as a whole at 25 in Figure 1. This is accomplished through the medium of suitable shafting 26 which includes the universal joints 27 and a splined slip connection 28. The shafting 26 is geared at 29 to a cross-shaft extending to the opposite side of the locomotive and from this point forward the adjusting connection is completed through a shaft 30 at each side of the locomotive.

I will now describe the details of the power reverse gear or servo motor as illustrated in Figures 2 to 10 of the drawings. It includes a suitable supporting framework 31 having attaching brackets 32. A reversible actuating shaft 33 is rotated through the medium of a pair of bevel gears 34 and 35, the latter of which is driven by a fluid pressure motor such as the air motor 36, the details of which motor are not illustrated because in and of themselves they form no part of the present invention. At its right-hand end, as viewed in Figure 2, the shaft 33 may be provided with any suitable coupling mechanism 37 for connection to the shaft 26 leading to the valve gear to be described in greater detail hereinafter.

The shaft 33 is provided with a screw 38 upon which is threaded a nut 39, said nut being adapted to travel along the screw in one direction or the other depending upon the direction in which the screw is being driven.

The motor 36 and its direction of operation are controlled by a valve and lever mechanism now to be described. The hand-operated reverse lever 40 having bifurcations 40a at its lower end, is pivoted in the frame 31 upon a pin 41, this pivot being located very much nearer the lower end of the reverse lever than it is to the upper end, as clearly shown in Figures 2 and 4. This provides the operator with the leverage necessary for easy actuation of the device. Above the pivot 41 the lever 40 passes over a fixed quadrant 42 having a series of notches 43 in its upper face into which the spring-held detent 44 is adapted to project, the latter being releasable through the medium of the hand actuated latch 45 and link 46.

In Figure 2 it will be noted that the notches 43 on the quadrant 42 are relatively coarse as compared with the arrangement shown in Figure 3, the reason being that the arrangement in Figure 2 is particularly adapted for use with a poppet valve actuating cam having a definite number of working faces or steps (Fig. 11) with which steps the quadrant notches correspond. The arrangement of Figure 3 is particularly suitable for situations where much finer or substantially continuous adjustments are desired. In Figure 3, therefore, there are a multiplicity of relatively fine teeth 43a on the quadrant 42a with a corresponding detent 44a so that the lever 40 can be adjusted, in effect, to almost any desired position in the quadrant rather than to a definitely stepped position such as is characteristic of Figure 2. This, however, is a detail which in no way affects the broader aspects of the present invention and is illustrated simply to demonstrate the flexibility and wide applicability of the present power reverse gear and the extreme fineness of valve adjustment which can be effected by its use. If desired, a pointer 47, movable over an arcuate dial 48 may be employed to give a visual indication of the cut-off in addition to that which is afforded by the position of the lever 40 itself.

The lower ends of the bifurcations 40a of the reverse lever 40 straddle the reverse shaft 33 and are connected to a floating lever 49 by means of a link 50 which link is mounted between the bifurcations upon a pivot pin 51 at a point beyond the reverse shaft 33 as shown to best advantage in Figures 2 and 4. The other end of the link 50 is mounted upon the pivot pin 52 which passes through the two side members 49a of the floating lever 49 as best illustrated in Figure 5. Therefore, the floating lever 49 is also, in effect, a bifurcated member, the bifurcations 49a of which are secured together by means of the cross web 53. The pivot pins 51 and 52 are retained in place between suitable finished pads 54 on the inside of the frame walls. It will be observed from Figure 2 (when the mechanism is in mid position) that the hand lever 40 and the floating lever 49 are substantially parallel, and the link 50 is approximately at right angles thereto. This arrangement cooperates with the various pivot and fulcrum points in a manner more fully described below.

The upper ends of the bifurcations 49a of the floating lever are pivotally mounted upon the traveling nut 39 and the lower ends are connected by the pivot pins 55 to the valve operating links 56 and it will be noted that the pivot pin 52 of the link 50 is very much closer to the top or nut pivot than it is to the lower or valve operating link pivot. This gives a high operating ratio without making the hand lever 40 too hard to operate and makes it possible for the control valve, to be described below, to respond with great sensitivity to any motion of the nut even though slight. This reduces to a minimum the effect of the necessary admission lap of the control valve as will further appear.

As seen in the detail views of Figures 5 to 10 inclusive, the control mechanism includes the oscillating valve 57 having the integral operating crank member 58 at one end and the detachable operating crank member 59 at the other end, one of the operating links 56 being connected to the crank member 58 by means of the crank pin 58a and the other to the crank member 59 by means of the pin 59a as shown most clearly in Figures 4 and 7. The valve 57 is mounted in the fixed bushing 60 and its mid portion is formed in the shape of a web 61 for controlling the various air passages to be described below. In addition, the valve 57 is provided with an extension having a flat upper face 62 which cooperates with a valve operating cam bar or lever 63. Above the central portion of the lever 63 is located the vertically arranged stem 64 of the main control or shut-off valve 65. The valve 65, as shown to best advantage in Figures 6 and 7, is of the poppet type and controls the fluid pressure coming in through the passage 66 and supply pipe 67. It will be seen, therefore, that rotation of the valve 57 in either direction will raise the lever 63 and bring its mid portion into contact with the stem 64 of the valve 65 so that the valve 65 will be opened to admit the fluid pressure to the passages 68 and 69 which lead to the inlet port 70 in the bushing 60 of the control valve 57.

The direction of operation of the reversible fluid pressure actuated motor 36 will depend upon the direction of rotation of the valve 57. If the valve 57, as viewed in Figures 6 and 10, is turned to the right, the fluid supply passage 69 will be connected to the fluid delivery passage 71 which discharges through the passage 71a leading to the motor 36. This will operate the motor in one direction. On the other hand, if the valve 57 is turned to the left, as viewed in Figures 6 and 10, then the fluid supply passage 71 will be connected to the fluid delivery pipe 72 which discharges to the motor 36 through the opening 72a, thereby causing the motor to operate in the opposite direction. When the fluid pressure is being delivered through one set of passages, the other set is open to exhaust through the port 73 in the bushing 60 and the passages 74. In case of failure of the air supply a hexagonal collar 33a is keyed to the cab end of the screw shaft 33 to allow of hand operation, said collar normally being encased by the removable cover 33b.

From the foregoing description it will be seen that my improved control valve mechanism includes not only directional or selective control for the motor 36 but also operational control, the former being effected by the oscillating selecting valve 57 and the latter by the poppet type shut-off valve 65 and that both functions are accomplished substantially simultaneously upon movement of the reverse lever 40 to either side of its mid or central position. For example, if the lever 40, as viewed in Figure 2, is pushed to the right, or let us say, forwardly on the locomotive, then the lower end of the floating lever 49 will be moved to the left around the nut 39 and the valve 57 will be moved in a clockwise direction up to the limit imposed by the stop shoulder 75 when it comes into contact with the stop pin or abutment 76. If, on the other hand, the reverse lever is moved to the left, or rearwardly on the locomotive, then the lever 49 will be swung on the nut 39 to the right, thereby rotating the valve 57 in a counterclockwise direction up to the limit imposed by the stop shoulder 77 when said shoulder comes into contact with the opposite side of the stop pin 76. (See particularly Figure 2.) In either direction, the shut-off valve 65 will be opened by the cam bar 63 and the motor will be operated in the direction selected.

As soon as the motor begins to turn the screw shaft 33, the threads 38 will move the nut 39 in a direction such as will tend to return the nut and, therefore, the upper pivot of the floating lever to its initial position, thereby closing the valve 65 and stopping the operation of the motor 36. Thus the reverse lever 40 may be moved to any preselected position on the graduated quadrant, and the mechanism will move the valve gear to a position of adjustment closely related thereto whereupon the mechanism ceases its operation. When the hand lever is locked by the latch, any reaction from the valve gear which may tend to cause the screw to move away from its corresponding angular position, will tend at the same time to open the control valve and cause the motor 36 to operate in a direction which is opposed to the impulse from the valve gear. It will be clear, therefore, that it is unnecessary to provide my improved device with a special locking mechanism because the motor will always act to oppose any tendency of the valve gear to creep in either direction.

From the foregoing description it will be apparent that, when the hand lever 40 is being actuated, the generally parallel floating lever 49 fulcrums on the nut pivot 39, but when the hand lever 40 is stationary, then the floating lever 49 fulcrums on the pin 52. Furthermore, the several connections to the floating lever 49, i. e. the pivots 39, 52, and 55, are arranged to effect a multiplication of the motions imparted to said lever either by the reverse lever 40 or by the nut member 39 in the motions imparted to the connection which actuates the valve control means. In other words, as already mentioned, the leverages employed in my improved device will yield a very much more rapid control valve action than has heretofore been possible, and thus a much more quickly responsive and accurate adjustment of the locomotive valve gear.

Furthermore, the lap of the shut-off valve 65 can be reduced to an absolute minimum with my improved construction. This lap is represented by the space between the upper face of the bar 63 and the lower end of the stem 64, which space need be just sufficient to permit tight seating of the valve 65 under any operating conditions which may be encountered. The factors which have a bearing on the size of this gap are expansion and contraction due to changes in temperature and alterations in dimensions due to normal wear. The lap may be adjusted by facing off the valve 65 on its seating face to decrease the clearance under the stem 64 or by filing the end of the stem 64 to increase the clearance.

Since the lap of the valve 65 can be made so small the corresponding angle of swing of the control valve cranks 58 and 59 can be held to a minimum consistent with manufacturing and service variations. My improvements make it possible to secure extremely sensitive and almost instantaneous response of the device to even very small motions of the floating lever 49. In other words, the mechanism I have adopted yields a servomotor construction by means of which it is possible to obtain far more accurate and definite valve gear adjustments than have ever been attained heretofore because the angular position of the rotating screws 33 corresponds exactly with the position of the reverse lever 40.

Another outstanding advantage of my improved construction resides in the fact that the motor 36 is never under air pressure except at times when the cut-off is being changed so that there is no tendency for the gear to "hunt."

Figure 13:
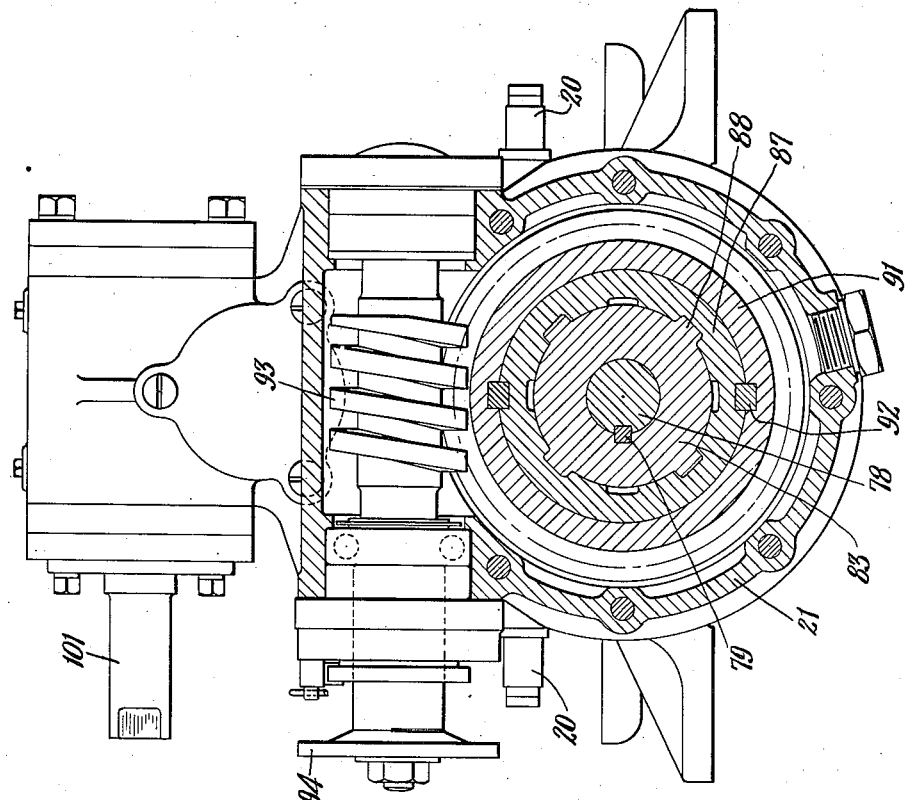
Fig. 13 is an enlarged section taken on the line 13—13 of Fig. 11.
Figure 12:
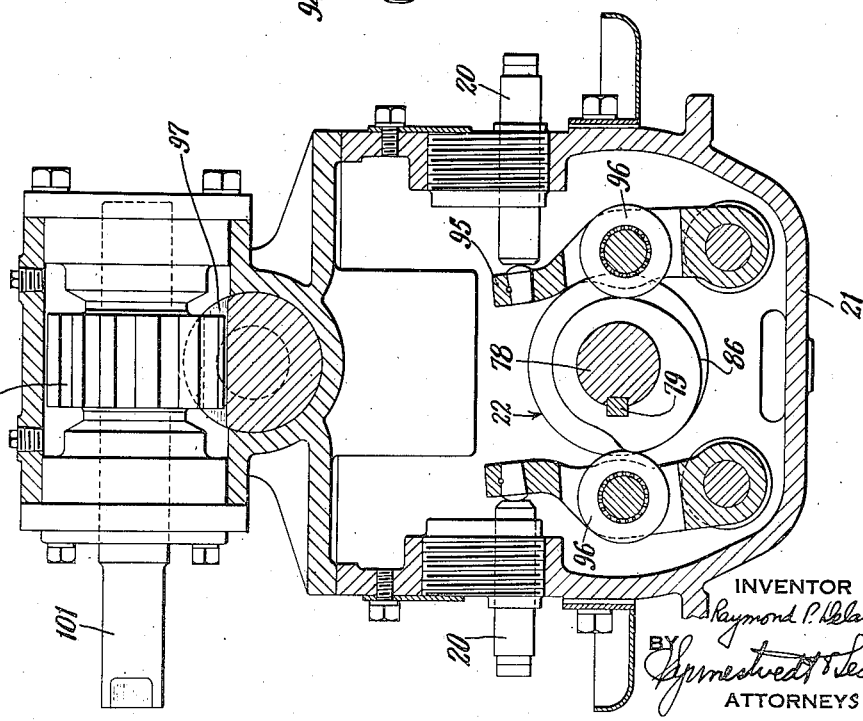
Fig. 12 is an enlarged section taken on the line 12—12 of Fig. 11.

The improved servomotor which has just been described is particularly useful, as indicated above, in combination with a valve gear of the cam actuated poppet valve type and in Figures 11 to 13 inclusive I have illustrated certain of the details of a mechanism of this type, the equipment shown in these figures being duplicated for each side of the locomotive. The cam member 22 in the housing 21 is arranged transversely of the locomotive in a position approximately midway between the ends of the locomotive cylinder 18. As viewed in Figure 11, the cam member 22 is divided into a left-hand portion 22a for actuating the exhaust valves and a right-hand portion 22b for actuating the inlet valves, the two parts in effect being made integral by their mounting upon a central shaft 78 to which they are keyed by means of the elongated key members 79. A piston-like head member 80 at the right-hand end is held in place by a washer 81 and a stud 82 which fit into a hollowed-out space in the end of the head 80. A similar head 83 at the left-hand end is held in place in a like manner by the washer 84 and stud 85. Each of the parts 22a and 22b is provided with a series of stepped actuating faces 86 and the parts are so designed and assembled as to bear a fixed relationship to each other and to the stems 20 which operate the poppet valves.

Surrounding the head 83 is a sleeve 87 which is splined thereto by the splines 88 so that the head and therefore the entire cam member 22 is free to move longitudinally of its housing 21, said housing, as shown to best advantage in Figure 11, being of sufficient length to accommodate the necessary movement. The sleeve 87 is mounted for rotation in the bushings 89 and 90 and near the left-hand end at a point located between these two bushings I provide a driving pinion or gear 91 which is keyed to the sleeve 87 by means of the keys 92. Meshing with the gear 91 is the worm wheel 93 which in turn is connected to the driving shaft 23 through any suitable coupling 94. The cam therefore is rotated in accordance with the speed and direction of motion of the locomotive inasmuch as the shaft 23, as already described, derives its motion from a connection 24 to one of the driving wheels.

The cam faces 86 are arranged to actuate the cam levers 95 in a manner well understood in this art, there being a suitable roller 96 on each member 95 for contacting the cam face 86.

The cam member 22 as a unit is moved longitudinally of its housing 21, in order to effect the necessary adjustment of the valves, by means of the driving pinion 98, rack member 97, and forked arm 99, the lower end of which latter fits into the slotted member 100 mounted on the shaft 78 between the adjacent ends of the two cam members 22a and 22b. (See particularly Figure 11). The pinion 98 is mounted upon a stub shaft 101 which is suitably connected to the shaft 30 already described, which latter shaft receives its motion from the power reverse gear or servo motor located in the cab. Thus the axial throw or translational movement of the valve gear members, e. g. the rack 97 and cam 22, is directly related to the rotation of shaft 33 in the power reverse gear, and is thus also related to the reciprocations of nut 39 thereof, although differing in extent since the thread 38 constitutes a speed-reducing connection to nut 39. However, although nut 39 and link 50 thus have a throw materially less than that imposed on said valve gear members, their effect upon the operation of the control valve mechanism of the power reverse gear is multiplied by the long arm 49a of floating lever 49.

In the embodiment illustrated in Figures 2 and 11 it is desired to call attention to the fact that the number of notches 43 in the quadrant 42 corresponds exactly to the number of working positions of the cam member 22. This correspondingly stepped arrangement is made possible by virtue of the extreme accuracy with which the device functions, each notch of the quadrant being effective to move the cam member 22 a distance corresponding to that which is needed to bring the next adjacent cam face into proper position for actuating the poppet valves. In other words, the angular position of the screw shaft 33 in my improved combination is made to correspond with such accuracy to the position of the hand lever as to permit absolutely definite and positive control of the position of the cam.

In this way the valve events will always exactly reflect the selected position of the reverse lever. This greatly reduces the possibility of overrunning a desired setting since the hand lever may be moved from notch to notch and the motor will automatically stop when the nut 39 is moved a corresponding amount which, of course, is equivalent to bringing the corresponding step on the cam member 22 into its proper position.

The arrangement just described involves what may be termed an intermittently progressive cam inasmuch as the steps 86 correspond to the steps or notches 43 of the quadrant 42. However, the invention is not necessarily to be limited to this type of cam because it is quite possible to utilize what might be described as a continuously progressive cam, i. e., one in which the operating face is not formed as a series of fixed steps but as a continuously progressive surface. When a cam of this type is preferred the quadrant of Figure 3 should be employed, namely a quadrant in which a large number of relatively fine notches 43a are provided so that the hand lever 40 may, in effect, be moved in a continuously progressive manner so as to correspond to a continuously progressive cam. Both arrangements will serve to give extreme and unusual accuracy in the adjustment of the valves and the operation of the valves will exactly correspond in both instances to the position of the hand lever.

As to constructural details, my improved mechanism is strong and compact and provides an arrangement of the various parts which minimizes distortion and wear and overcomes the effects of changes in temperature and adds materially to the reliability, selectivity, accuracy and uniformity of the operational characteristics of my improved steam distribution mechanism. For example, tests of my improved power reverse gear or servo motor have shown that the screw will stop within 6 degrees of rotation of any screw position calculated to correspond to a given notch on the quadrant and will hold this position within about 15 degrees against creep, for a screw having a total of twelve turns in either direction, which means that the gear will stop at a given point within 0.14% of the total travel and will not vary from that point by more than approximately 0.33% at any time. When the effects of service wear are determined, it may even be possible to still further reduce this small variation by reducing the lap of the main control valve 65 as already described.

A great advantage of my improved device resides in the speed with which the gear can be reversed from full forward to full reverse position.

It will also be seen that my improved device makes it possible for the engineer to feel as well as see the position of the cut-off since the hand lever follows the screw nut. In addition, no special lock is necessary, as already mentioned, due to the self-centering action of the mechanism and the sensitiveness of its functioning. Fourthly, no special travel limit device is needed for the same reason.

To summarize, it will be seen that I have provided steam distribution mechanism by means of which it is possible to obtain very accurate and very definite control of the valve events. This will be more fully appreciated when it is kept in mind that, with mechanisms heretofore in use, power reverse gears or servomotors have been employed which required considerable motion of the screw or link connected to the valve gear in order to actuate the control mechanism. This is true insofar as I am aware with all power reverse gears utilizing floating levers. With my improvements, however, it is possible to make the arm of the floating lever which connects to the control valve approximately four times as long as the arm which is pivoted on the screw nut which, of course, means that a very small rotation of the screw shaft with a correspondingly small displacement of the nut will move the control valve far enough to admit air pressure for the purpose of opposing further movement in the same direction. In short, my improved mechanism is so sensitive that it is possible to control the rotational movement of the shaft to a very great nicety so that for any given position of the hand lever the angular position of the shaft and consequently the position of the cam can be held to very narrow limits. As a cooperating factor I have arranged to connect the power reverse gear or servomotor to the valve gear by means of a reverse shaft which is rendered substantially free from the effects of changes in temperature first because it is a rotary shaft and second because of the slip joint 28. It will be clear, therefore, that all the parts of my improved mechanism cooperate to yield an unusually simple, effective and accurate mechanism for controlling the distribution of the steam on a steam locomotive.

I claim:

1. In a power reverse gear for adjusting the valve gear of a locomotive, a reversible fluid pressure motor, rotatable shafting operatively interposed between said motor and the valve gear, a reciprocable member having a speed-reducing connection through which it is reciprocated by the rotation of said shafting, valve means for controlling operation of said motor, an engineman's reverse lever member of the graduated-selective-position type, and floating lever mechanism interconnecting said valve means with both said members and constructed and coupled to said valve means so as to open said valve means for motor operation in one direction or the other to a limit determined by the graduated position selected by said reverse lever member and to close said valve means upon movement of said reciprocable member to a position predeterminedly related to a valve gear adjustment corresponding to the selected position of said reverse lever member, said floating lever mechanism having an effective lever arm in its connection to said valve means which is greater than the effective lever arm between its points of connection to the two members aforesaid, so that the motion of either of said members is multiplied in transmission to said valve means.

2. In a power reverse gear for adjusting the valve gear of a locomotive, a reversible fluid pressure motor, rotatable shafting operatively interposed between said motor and the valve gear, a reciprocable member having a speed-reducing connection through which it is reciprocated by the rotation of said shafting, valve means for controlling operation of said motor including a reversing valve and a poppet-type shut-off valve in series, an engineman's reverse lever member of the graduated-selective-position type, and floating lever mechanism interconnecting said valve means with both said members and constructed and coupled to said valve means so as to selectively condition said reversing valve and open said poppet-valve for motor operation in one direction or the other to a limit determined by the graduated position selected by said reverse lever member and to close said valve means upon movement of said reciprocable member to a position predeterminedly related to a valve gear adjustment corresponding to the selected position of said reverse lever member, said floating lever mechanism having an effective lever arm in its connection to said valve means which is greater than the effective lever arm between its points of connection to the two members aforesaid, so that the motion of either of said members is multiplied in transmission to said valve means.

3. For adjusting a translationally movable member in a steam locomotive valve gear mechanism, a rotatable shaft, a fluid pressure actuated motor for rotating said shaft, valve means for controlling the flow of the fluid pressure, a nut threaded on the shaft for translational movement therealong, the said movement being different in degree but related to the translational movement of said valve gear member, a floating lever having one end pivoted on said nut and the other end operatively associated with said valve means, a reverse lever, and an operating connection between the reverse lever and the floating lever, said connection including a pivot on the floating lever adapted to act as a fulcrum for the floating lever, said last pivot being located closer to the nut pivot end than to the opposite end of the floating lever.

4. A power reverse gear for imparting translational movement to a steam locomotive valve gear member, said reverse gear including a rotatable shaft for effecting said translational movement, a fluid pressure actuated reversible motor for rotating said shaft, valve means for controlling the flow of the fluid pressure, a nut member threaded on said rotatable shaft for translational travel therealong, said travel being different in degree but related to the translational movement of said valve gear member, a floating lever pivotally connected to said nut member, an actuating connection between said floating lever and the fluid pressure valve control means, a hand operated actuating member, and an actuating connection between said hand operated member and said floating lever having a throw which is materially less than the related translational movement of said valve gear member, said three points of connection to the floating lever being positioned to effect a multiplication of the movements derived from the hand-operated actuating member and from the nut member and imparted to the connection between the floating lever and the fluid pressure valve control means.

5. Adjusting mechanism for a steam locomotive valve gear having a translationally movable valve actuating cam, a power gear having a rotary reverse shaft, a reversible fluid pressure actuated motor for operating said shaft, a thread on the shaft, a nut member mounted on said thread for translational movement therealong, said translational movement being different in degree but related to the translational movement of said valve actuating cam, valve means for controlling the direction and flow of fluid pressure to said motor, a member for operating said valve means, crank means for moving said member, a floating lever for moving said crank means, said floating lever having one end connected to said crank means and the other end pivoted on said nut member to move with the latter, an engineman's hand lever having a pivotal mounting, and a link connection between the hand lever and said floating lever, said link being pivoted on said latter lever at a point closer to its nut member end than to its other end.

6. The mechanism of claim 5 wherein the translationally movable valve actuating cam is provided with a series of stepped operating surfaces and wherein the engineman's hand lever is movably associated with stops adapted to hold its setting in stepped increments corresponding to the steps of the cam.

7. The mechanism of claim 5 wherein the pivotal mounting of the engineman's hand lever is located at a point intermediate its ends and wherein one end thereof is of forked construction and arranged to straddle said power shaft with the link to the floating lever being pivoted to the ends of the fork at a point lying beyond the said shaft.

8. A power reverse gear for adjusting the valve events of a steam locomotive, said gear comprising a rotatable shaft, a fluid pressure actuated reversible motor for rotating said shaft, reversing valve means for controlling the direction of fluid flow, a poppet type valve means for controlling the shut-off of the fluid, valve actuating means, a nut member threaded on the rotatable shaft to move therealong at a reduced speed upon rotation of the shaft, a pivoted floating lever having a connection to said nut member, a connection between said floating lever and said valve actuating means adapted to assure movement of the reversing valve means in conformity with movement of said floating lever, a movable engineman's control lever member adapted to be moved to and secured in selected positions of adjustment, said floating lever being substantially parallel with said control lever member when the gear is in mid position, and an operating connection between said engineman's control lever member and said floating lever comprising a link between them extending substantially at right angles to both of them when the gear is in mid position, said three points of connection to said floating lever being positioned to effect a multiplication of the movements derived from the engineman's control member and from the nut member and imparted to the connection between the floating lever and the valve actuating means.

9. A power reverse gear in accordance with claim 8 wherein the connection between the floating lever and the nut member is at one end of the lever and the connection to the valve actuating means is at the other end of the lever with the connection to the engineman's control member lying therebetween but at a point closer to the nut member connection than to the valve actuating connection.

10. Adjusting mechanism for a steam locomotive valve gear having a translationally movable valve actuating member, said mechanism comprising an engineman's reverse lever having a pivotal mounting intermediate its ends, a cooperating quadrant, a rotatable power shaft, said reverse lever having a bifurcated lower end arranged to straddle said power shaft, a thread on the shaft, a nut member translationally movable along said thread upon rotation of said shaft, the movement of said nut member being different in degree but related to the translational movement of said valve actuating member, a reversible fluid pressure actuated motor for driving the power shaft, valve means for controlling the direction and flow of fluid pressure to said motor, a floating lever for actuating said valve means, said last lever having one end connected to said valve means and the other end pivoted on said nut member to move therewith, a link pivoted to the ends of the reverse lever bifurcations and to said floating lever, said latter pivot being closer to the nut end than to the valve end thereof, a stepped actuating cam coupled to said power shaft to be adjusted thereby in a direction longitudinally of the series of steps, a series of notches on the reverse lever quadrant, and latch means for locking the reverse lever in any selected notch, said notches and the steps on the actuating cam corresponding to one another whereby any desired step may be brought into operative position in accordance with the position of the reverse lever.

11. In a power reverse gear, the combination of a rotatable shaft, a reversible fluid pressure actuated motor for driving said shaft, valve means for controlling the direction and flow of the fluid pressure, a nut member threaded on the shaft to move therealong upon rotation of the shaft, a floating lever of bifurcated construction, having a pair of side members the corresponding ends of which are mounted to pivot on the nut member upon an axis which is disposed transversely of the axis of the shaft, one of said pair of side members being arranged at each side of the reverse shaft, a connection between the opposite end of said side members and said valve means, a pivoted reverse lever, and an operating link connecting the reverse lever and the floating lever, the connection of said link with said floating lever being a pivoted connection upon a pin extending between the side members.

12. The structure of claim 11 where the lower end of the reverse lever is also of bifurcated construction arranged to straddle the rotatable shaft.

13. The structure of claim 11 where the lower end of the reverse lever is also of bifurcated construction arranged to straddle the rotatable shaft and wherein the link lies below the rotatable screw between the bifurcations of both levers.

RAYMOND P. DELANO, Jr.

REFERENCES CITED

The following references are of record in the file of this patent:

UNITED STATES PATENTS

| Number | Name | Date |
|---|---|---|
| 253,199 | Good | Feb. 7, 1882 |
| 1,353,656 | Heisler | Sept. 21, 1920 |
| 1,597,430 | Brown | Aug. 24, 1926 |
| 1,682,888 | Craig | Sept. 4, 1928 |
| 1,735,727 | Brown | Nov. 12, 1929 |
| 1,814,074 | Blunt et al. | July 14, 1931 |
| 2,016,727 | Roth | Oct. 8, 1935 |
| 2,064,051 | Allard | Dec. 15, 1936 |
| 2,112,760 | Brown | Mar. 29, 1938 |
| 2,117,109 | Stevenson et al. | May 10, 1938 |
| 2,243,865 | Hoy | June 3, 1941 |
| 2,327,344 | Forker | Aug. 24, 1943 |
| 2,385,957 | Woodard | Oct. 2, 1945 |

FOREIGN PATENTS

| Number | Country | Date |
|---|---|---|
| 396,657 | Germany | June 10, 1924 |
| 668,388 | France | July 9, 1929 |

Certificate of Correction

Patent No. 2,466,391.　　　　　　　　　　　　　　　　　　April 5, 1949.

RAYMOND P. DELANO, Jr.

It is hereby certified that errors appear in the printed specification of the above numbered patent requiring correction as follows:

Column 10, line 61, claim 5, strike out the word "reverse" and insert the same after "power", line 60, same claim;

and that the said Letters Patent should be read with these corrections therein that the same may conform to the record of the case in the Patent Office.

Signed and sealed this 6th day of September, A. D. 1949.

[SEAL]

THOMAS F. MURPHY,
*Assistant Commissioner of Patents.*